United States Patent

Moriya et al.

[11] Patent Number: 5,605,959
[45] Date of Patent: Feb. 25, 1997

[54] PARTICULATE VINYL POLYMER AND WATER-BASE COATING COMPOSITION USING THE SAME

[75] Inventors: Makoto Moriya; Seiji Nishimura; Yasutaka Doi, all of Nagoya, Japan

[73] Assignee: Mitsubishi Rayon Co., Ltd., Tokyo, Japan

[21] Appl. No.: 566,992

[22] Filed: Dec. 4, 1995

Related U.S. Application Data

[62] Division of Ser. No. 319,036, Oct. 6, 1994, Pat. No. 5,496,904.

[30] Foreign Application Priority Data

Oct. 6, 1993 [JP] Japan .................................. 5-250538

[51] Int. Cl.⁶ ........................................................ C08L 31/02
[52] U.S. Cl. .................................... 524/833; 524/832
[58] Field of Search ........................... 526/318.4, 318.44; 524/832, 833

[56] References Cited

U.S. PATENT DOCUMENTS 4,320,207  3/1992  Watanabe et al. .................... 523/54
5,496,904  3/1996  Moriya et al. ..................... 526/318.4

*Primary Examiner*—Jeffrey T. Smith
*Attorney, Agent, or Firm*—Oblon, Spivak, McClelland, Maier & Neustadt, P.C.

[57] ABSTRACT

A particulate vinyl polymer is provided. At least 95 wt. % of its particles have a minor axis A and a major axis B, which are in a relationship of $1 \leq B/A \leq 1.5$ and individually range from 30 μm to 400 μm. The polymer has an acid value of from 30 to 150 mgKOH/g. This particulate vinyl polymer is excellent in work-ability such as the solubility in aqueous medium, and is useful as a raw material for water-base coating compositions having superb dispersion of a pigment and excellent waterproofness.

11 Claims, No Drawings

PARTICULATE VINYL POLYMER AND WATER-BASE COATING COMPOSITION USING THE SAME

This is a Division, of application Ser. No. 08/319,036 filed on Oct. 6, 1994 now U.S. Pat. No 5,496,904.

BACKGROUND OF THE INVENTION

1. Field of the Invention

This invention relates to a particulate vinyl polymer and also to a water-base coating composition using the particulate vinyl polymer. More specifically, this invention is concerned with a particulate vinyl polymer excellent in workability such as the solubility in an aqueous medium and also with a water-base coating composition which can form coating films excellent in waterproofness, adhesion and the like and which also has excellent pigment dispersibility and is hence suited for paints, inks and the like.

2. Description of the Related Art

From the environmental viewpoint, there is an ever-increasing demand for water-base coating compositions in recent years, leading to the development of a wide variety of products.

In an emulsion, dispersion or the like of a polymer, the polymer is contained in a form distributed in water. The emulsion, dispersion or the like therefore does not exhibit any substantial increase in viscosity even when the molecular weight of the polymer becomes higher. This makes it possible to use a polymer of high molecular weight, leading to the advantage that a water-base coating composition capable of forming a coating film of excellent physical properties can be formulated. Numerous water-base coating compositions have hence been developed to date.

Whenever dispersion of a pigment at a high concentration is needed, however, it is indispensable to rely upon the action that an associated polymer surrounds the pigment to prevent its re-agglomeration. In an emulsion, dispersion or the like in which a polymer is contained in a form dispersed in water, it has however been difficult to fully prevent such re-agglomeration of a pigment, thereby failing to obtain sufficient pigment dispersibility. To surround the pigment for the prevention of its re-agglomeration, it is needed that the polymer must be contained in a form dissolved in water. To this end, the development of water-soluble polymers has been proceeded with in various ways.

Typical examples of such water-soluble polymers include polyvinyl alcohols and sodium salts of polyacrylic acids. These water-soluble polymers are however accompanied by many practical inconveniences, because even after their formation into coating films, they are prone to dissolution in water and the coating films are thus re-dissolved and damaged by a slightest adverse cause such as exposure to water droplets.

To overcome the above inconveniences, a technique was developed. According to this technique, a polymer containing acidic groups such as sulfonic or carboxylic groups is poured into an aqueous medium containing a volatile base so that the polymer is neutralized into a salt and is hence rendered soluble in water. In the course of drying subsequent to coating, the volatile base is allowed to evaporate so that the polymer becomes insoluble. Water-base coating compositions based on this technique have been put on the market in recent years.

The above water-base coating compositions are however accompanied by the drawback that the dissolution of a polymer in an aqueous medium containing a volatile base takes time. It has accordingly been attempted to enhance the solubility of a polymer by increasing its acid value or comminuting it into fine particles. A coating film which has been formed from a polymer with an increased acid value however involves the problem that it has low waterproofness and cannot avoid deteriorations such as whitening. A comminuted, that is, fine particulate polymer, on the other hand, is accompanied by the problem that it tends to scatter around as dust upon handling and hence reduces workability.

Illustrative polymer particles having dust-free property include polymer powder such as those disclosed in Japanese Patent Laid-Open No. 242807/1990. They can be obtained by salting out fine particles, which have been produced by emulsion polymerization, and then collecting them by filtration. Such polymer powder however has irregular particle shapes and hence are poor in free-flowing property. When a worker attempts to take the polymer powder out of a bag to charge them into an aqueous medium, for example, the polymer powder does not flow out of the bag at a uniform rate, resulting in irregular charging into the aqueous medium. Upon dissolution of the polymer powder, polymer aggregates may be formed, resulting in the problems that the polymer powder may not be dissolved well and the workability is lowered.

It has also been attempted to blend a dispersion, emulsion or the like of a polymer having good waterproofness in an aqueous polymer solution. When dispersion of a pigment at a high concentration is needed, however, it is difficult to achieve both pigment dispersibility and waterproofness while holding a good balance therebetween.

SUMMARY OF THE INVENTION

An object of this invention is to provide a particulate vinyl polymer, which has good free-flowing and dust-free properties and is hence easy to handle.

Another object of this invention is to provide a particulate vinyl polymer, which is highly soluble in an aqueous medium and is useful as a raw material for a water-base coating composition capable of forming a coating film having excellent dispersion of a pigment and superb waterproofness.

A further object of this invention is to provide a water-base coating composition, which is usable as mixtures with aqueous dispersions of a wide variety of polymers and can form coating films having excellent waterproofness and outstanding dispersion of a pigment.

In one aspect of the present invention, there is thus provided a particulate vinyl polymer. At least 95 wt. % of its particles have a minor axis A and a major axis B, which are in a relationship of $1 \leq B/A \leq 1.5$ and individually range from 30 μm to 400 μm. The polymer has an acid value of from 30 to 150 mgKOH/g. This particulate vinyl polymer is excellent in workability such as the solubility in aqueous medium, and is useful as a raw material for water-base coating compositions having superb pigment dispersion and waterproofness.

The particulate vinyl polymer according to this invention is excellent in workability such as the solubility in aqueous medium, and is useful as a raw material for water-base coating compositions having superb dispersion of a pigment and excellent waterproof

DETAILED DESCRIPTION OF PREFERRED EMBODIMENTS

The particulate vinyl polymer according to this invention has an acid value of 30–150 mgKOH/g as expressed in terms of the milligrams of KOH required to neutralize 1 g of the vinyl polymer when an aqueous solution of the vinyl polymer is titrated with a solution of KOH in ethanol by using as a reference the color transition point of phenolphthalein. Acid values smaller than 30 mgKOH/g tend to result in a reduction in the solubility in an aqueous medium, whereas acid values greater in excess of 150 mgKOH/g are apt to lead to the formation of a coating film of reduced waterproofness. The preferred acid value is in a range of 40–90 mgKOH/g.

Further, at least 95 wt. % of particles of the particulate vinyl polymer are required to have a minor axis A and a major axis B, which are in a relationship of $1 \leq B/A \leq 1.5$ and are individually in the range of 30–400 μm. B/A ratios greater than 1.5 (B/A>1.5) lead to insufficient free-flowing property, so that when a worker attempts to take the particulate vinyl polymer out of a bag to charge it into an aqueous medium, for example, the particulate vinyl polymer does not flow out of the bag at a uniform rate, resulting in irregular charging into the aqueous medium and upon dissolution of the particulate vinyl polymer, aggregates of the polymer are formed, the polymer may not be dissolved well and the workability is lowered. Such large B/A ratios are therefore not preferred. The preferred B/A ratio range from 1 to 1.1, both inclusive ($1 \leq B/A \leq 1.1$). As described above, it is also required that at least 95% of the particles of the particulate vinyl polymer individually have a minor and major axes A and B in the range of 30–400 μm. If either the minor axis A or the major axis B is smaller than 30 μm, the particulate vinyl polymer tends to scatter around as dust and hence to lower the workability. If either the minor axis A or the major axis B becomes greater than 400 μm, on the other hand, the dissolution velocity in aqueous media is lowered. Preferably the minor and major axes A and B are each in a range of 70–250 μm.

In the present invention, it is important that at least 95 wt. % of the particulate vinyl polymer meets the above-described configurational conditions, because proportions smaller than 95% significantly impair the workability and the dissolution velocity in aqueous media.

The particulate vinyl polymer according to the present invention preferably comprises (a) 30–90 wt. % of methyl methacrylate, (b) 0–30 wt. % of an aromatic vinyl compound, (c) 4–30 wt. % of an acidic-group-containing vinyl compound and (d) 0–66 wt. % of a further vinyl monomer copolymerizable with methyl methacrylate (a), the aromatic vinyl compound (b) and the acidic-group-containing vinyl compound (c).

Methyl methacrylate (a) is a component to impart hardness to the vinyl polymer and is used in a proportion of 30–90 wt. %. Proportions of methyl methacrylate (a) smaller than 30 wt. % tend to result in lower hardness, while its proportions greater than 90 wt. % tend to lead to reduced solubility in aqueous media. Proportions of methyl methacrylate (a) outside the above range are therefore not preferred.

The aromatic Vinyl compound (b) is effective in imparting waterproofness to a resulting coating film. The aromatic vinyl compound (b) can be polymerized in a proportion up to 30 wt. % as needed. More preferably, it is used in a range of 0–20 wt. %. Proportions of the aromatic vinyl compound (b) greater than 30 wt. % are not preferred because such high proportions tend to lower the solubility in aqueous media. Specific examples of the aromatic vinyl compound (b) include styrene, α-methylstyrene, p-methylstyrene and benzyl (meth)acrylate. Among these, styrene is particularly preferred.

The acid-group-containing vinyl compound (c) serves to provide the vinyl polymer with acidic groups. It is a compound containing one or more acidic groups, such as a carboxylic acid or sulfonic acid, and is used in the range of 4–30 wt. % so that the resulting vinyl polymer has an acid value of 30–150 mgKOH/g. As examples of the acid-group-containing vinyl compound (c), vinyl compounds containing one or more carboxylic group are preferred because they can provide vinyl polymers good in the dispersibility in aqueous media, waterproofness and pigment dispersibility. Specific examples of the acidic-group-containing vinyl compound (c) include monobasic acids such as acrylic acid, methacrylic acid and crotonic acid; dibasic acids such as fumaric acid, maleic acid and itaconic acid; and their partial esterification products. Among these, methacrylic acid is especially preferred. It is possible to use two or more of these compounds in combination.

Further, the further vinyl monomer (d) copolymerizable with the above monomers (a) to (c) is used in the range of 0–66 wt. % and can be chosen as desired from those containing at least one polymerizable vinyl group in accordance with the application purpose. Specific examples of the vinyl monomer (d) include $C_{1-18}$-alkyl (meth)acrylates such as ethyl (meth)acrylate, n-butyl (meth)acrylate, i-butyl (meth)acrylate, t-butyl (meth)acrylate, cyclohexyl (meth)acrylate, 2-ethylhexyl (meth)acrylate, lauryl (meth)acrylate, and stearyl (meth)acrylate; hydroxyalkyl (meth)acrylate such as 2-hydroxyethyl (meth)acrylate and 2-hydroxypropyl (meth)-acrylate; glycol di(meth)acrylates such as ethylene glycol di(meth)acrylates and butylene glycol di(meth)-acrylates; alkylaminoalkyl (meth)acrylates such as dimethylaminoethyl (meth)acrylate; dimethylaminoethyl (meth)acrylate methyl chloride; allyl (meth)acrylate; trimethylolpropane tri(meth)acrylate; vinyl acetate; vinyl propionate; and (meth)acrylonitrile.

Further, the particulate vinyl polymer according to the present invention preferably has a second-order transition temperature of 10°–150° C., more preferably 30°–100° C., and most preferably 35°–100° C., as (differential scanning calorimetry). Second-order transition temperatures lower than 10° C. tend to lead to insufficient antifouling property and reduced blocking resistance, whereas second-order transition temperatures higher than 150° C. are apt to result in friable coating films. On the other hand, the weight average molecular weight of the particulate vinyl polymer as measured by GPC (gas permeation chromatography) is preferably in a range of 6,000–100,000, with a range of 8,000–60,000 being more preferred. Weight average molecular weights smaller than 6,000 tend to result in friable coating films whereas weight average molecular weights greater than 100,000 are inclined to lead to reduced water solubility.

As a polymerization process upon production of the particulate vinyl polymer according to this invention, a known process such as suspension polymerization, solution polymerization or bulk polymerization can be applied. Suspension polymerization is however particularly preferred, for example, for the ready availability of the acid value and particle shape specified in the present invention and also from the viewpoint of productivity. When suspension polymerization is applied, the particulate vinyl polymer according to the present invention can be easily obtained by separating a solid polymerization product from a dispersion medium such as water subsequent to the polymerization. Filtration is a preferred method for separating it.

Further, a particulate vinyl polymer—which is obtained by the one-shot monomer charging process that monomers are charged at once in a polymerization system and their polymerization is then initiated—is superior in both waterproofness and pigment dispersibility to that obtained by charging monomers in several portions into a polymerization system while allowing their polymerization to proceed or by dropping monomers into a polymerization system over several hours while allowing the polymerization to proceed. This advantage appears to be attributed to the copolymerizability of the monomers.

As a dispersant for the suspension polymerization, it is possible to use a known water-soluble high-molecular substance such as polyvinyl alcohol having a saponification degree in a range of 70–100% or poly[sodium (meth)acrylate]. Although no particular limitation is imposed on a solvent for the solution polymerization insofar as it can dissolve the monomers employed in the present invention and also the resulting polymer, its illustrative examples include alcohols such as methanol, ethanol, isopropyl alcohol and n-butanol; glycols such as "Ethyl Cellosolve" (trade name for ethylene glycol monoethyl ether; product of Union Carbide Corporation), "Cellosolve Acetate" (trade name for ethylene glycol monoethyl ether acetate; product of Union Carbide Corporation), "Butyl Carbitol" (trade name for diethylene glycol monobutyl ether; product of Union Carbide Corporation) and propylene glycol methyl ether; acetate esters such as ethyl acetate and butyl acetate; and ketones such as methyl ethyl ketone and methyl isobutyl ketone.

As a polymerization catalyst, it is possible to use a conventionally known initiator as needed depending on the application purpose, for example, an azo initiator such as azobisisobutyronitrile or a peroxide initiator such as benzoyl peroxide.

To regulate the molecular weight of the vinyl polymer, a chain transfer agent such as n-dodecyl mercaptan or α-methylstyrene dimer can be used as needed.

The particulate vinyl polymer obtained as described above can be used as a water-base coating composition (A) by dissolving it in an aqueous medium. In this case, a base—which is employed to neutralize 50–100% of acidic groups in the particulate vinyl polymer to form a salt, thereby imparting water solubility to the particulate vinyl polymer and dissolving it in the aqueous medium—preferably has a boiling point not higher than 200° C. If the acidic groups in the particulate vinyl polymer are neutralized only to less than 50%, the polymer is dispersed in the aqueous medium so that the resulting water-base coating composition tends to have insufficient pigment dispersibility. On the other hand, use of a base having a boiling point higher than 200° C. for neutralization tends to result in a coating film of reduced waterproofness. It is preferred to neutralize 70–100% of the acid groups in the particulate vinyl polymer.

No particular limitation is imposed on the method for dissolving the particulate vinyl polymer in an aqueous solvent. It is possible to dissolve the particulate vinyl polymer in a short time by charging it into an aqueous medium, which contains a volatile base and has been heated to 50° C. or so, and stirring the resulting mixture.

Illustrative examples of the volatile base include ammonia, triethylamine, propylamine, diethylamine, tripropylamine, dibutylamine, amylamine, 1-aminooctane, 2-dimethylaminoethanol, ethylaminoethanol, 2-diethylaminoethanol, 1-amino-2-propanol, 2-amino-1propanol, 3-amino-1-propanol, 1-dimethylamino-2propanol, 3-dimethylamino-1-propanol, 2-propylamino-ethanol, ethoxypropylamine, aminobenzyl alcohol, and morpholine.

The water-base coating composition (A) can be obtained by dissolving the particulate vinyl polymer of this invention usually at a concentration of 15–35 wt. %, preferably at a concentration of 20–30 wt. % in an aqueous medium.

The particulate vinyl polymer according to the present invention can also be used as a water-base coating composition (B) by mixing (I) an aqueous solution of the particulate vinyl polymer solution in an aqueous medium with (II) an aqueous dispersion of another polymer.

With respect to the aqueous particular vinyl polymer solution (I) in the above case, the acidic groups of the particulate vinyl polymer can be neutralized by a base as in the case of the water-base coating composition (A). It is unnecessary to neutralize all the acidic groups. Usually, 30% or more of the acidic groups are neutralized. As exemplary bases usable for the neutralization, the above-exemplified volatile bases can be mentioned.

No particular limitation is imposed on the type of the polymer in the aqueous dispersion (II) insofar as a polymer having a weight average molecular weight of 200,000–2,000,000 is employed. Illustrative usable polymers include acrylic resins, alkyd resins, urethane resins, epoxy resins, polyester resins, vinyl resins such as polyvinyl chloride and polyvinyl acetate, and cellulose resins such as nitrocellulose and cellulose acetate butyrate.

The second-order transition temperature of the polymer contained in the aqueous dispersion (II) is preferably 120° C. or lower, with 30°–120° C. being more preferred, because second-order transition temperatures higher than 120° C. tend to result in a coating film susceptible to cracking. Further, weight average molecular weights lower than 200,000 tend to result in coating films having insufficient toughness, whereas weight average molecular weights higher than 2,000,000 are inclined to lead to coating films prone to cracking.

For the production of the aqueous polymer dispersion (II), various methods can be adopted, including (a) a method making use of emulsion polymerization, (b) a method of neutralizing with a base a solution of a polymer containing acidic groups such as carboxyl groups in a hydrophilic organic solvent, said solution having been prepared by dissolving the polymer in the hydrophilic organic solvent or by solution-polymerizing the polymer in the hydrophilic organic solvent, and then dispersing the thus-neutralized solution in water, and (c) a method of dissolving the polymer in a hydrophilic organic solvent and then dissolving the resulting solution in surfactant-containing water under high shear force. Of these, the aqueous polymer dispersion prepared by emulsion polymerization is particularly preferred for its good waterproofness.

The water-base aqueous composition (B) can be prepared by mixing (I) the aqueous solution of the particulate vinyl polymer and (II) the aqueous dispersion of the polymer at a (I)/(II) ratio of from 5/95 to 95/5 in terms of polymer solid. Mixing ratios smaller than 5/95 tend to make it difficult to form a tough coating film which does not form cracks without using any film-forming aid, while mixing ratios greater than 95/5 are inclined to lead to coating films reduced in waterproofness. Mixing ratios outside the above range are therefore not preferred. No particular limitation is imposed on the mixing method of (I) the aqueous solution of the vinyl polymer with (II) the aqueous dispersion of the polymer. They can be mixed together at room temperature, or they can be mixed together after heating them. Further, the aqueous polymer dispersion (II) is usually employed at a polymer concentration of 25–60 wt. %.

The particulate vinyl polymer according to the present invention can also be used as a water-base coating composition (C) by mixing (III) an aqueous solution of the particulate vinyl polymer in an aqueous medium with (IV) an aqueous dispersion of a urethane polymer.

The second-order transition temperature of the particulate vinyl polymer employed in the above case is preferably 20°–110° C. as measured by DSC. The weight average molecular weight of the vinyl polymer as measured by GPC is preferably 6,000–30,000, more preferably 8,000–25,000. Weight average molecular weights lower than 6,000 tend to result in various drawbacks such as friable coating films, whereas weight average molecular weights higher than 30,000 have tendency of leading to poor compatibility with the urethane polymer.

To obtain the aqueous solution (III) of the particulate vinyl polymer, the acidic groups in the vinyl polymer are neutralized using a base to form a salt so that water solubility is imparted to the vinyl polymer, and the vinyl polymer is then dissolved in an aqueous medium. It is unnecessary to neutralize the entire acidic groups of the vinyl polymer. In general, 30% or more of the acidic groups are neutralized. As examples of the base used in the neutralization, the above-described volatile bases can be mentioned.

The aqueous dispersion of the urethane polymer, on the other hand, can be a self-emulsifiable emulsion obtained by extending with water or a polyamine such as a di- or tri-amine a urethane prepolymer, which is composed of (e) an aliphatic or alicyclic diisocyanate, (f) a diol compound having a number average molecular weight of 500–5,000 and (g) an acid-group-containing diol and has an NCO/OH equivalent ratio of 1.1–1.9, either after or while neutralizing the urethane prepolymer with a tertiary amine.

Illustrative examples of the aliphatic or alicyclic diisocyanate (e) include aliphatic diisocyanates such as hexamethylenediisocyanate and 2,2,4-trimethylhexanediisocyanate; $C_{4-18}$-alicyclic diisocyanates such as isophoronediisocyanate, 1,4-cyclohexanediisocyanate and 4,4'-dicyclohexylmethane diisocyanate; and modified products of these diisocyanates (carbodiimido-, urethodiono- and urethoimino-containing modified products). Particularly preferred examples are hexamethylene diisocyanate and isophorone diisocyanate. Two or more of these diisocyanates can be used in combination. Aromatic diisocyanates cannot be used for their excessive reactivity with water upon extension with water or a polyamine.

The diol compound (f) whose number average molecular weight is 500–5,000 is a compound which has a number average molecular weight of 500–5,000 and usually contains hydroxyl groups at terminals thereof. Number average molecular weights smaller than 500 result in friable coating films while number average molecular weights greater than 5,000 lead to coating films lacking in flexibility. Specific examples of the diol compound (f) include those obtained by (co)polymerizing alkylene oxides such as ethylene oxide and propylene oxide or heterocyclic ethers such as tetrahydrofuran, for example, polyethylene glycol, polypropylene glycol, polytetramethylene ether glycol and polyhexamethylene ether glycol; polyethylene adipate, polybutylene adipate, polyneopentyl adipate, poly-3-methylpentyl adipate, polyethylene/butylene adipate, and polyneopentyl/hexyl adipate; polylactone diols such as polycaprolactone diol; and polycarbonate diols. Also usable are water-soluble polyester diols obtained by copolymerization of sodium5-sulfoisophthalate with diethylene glycol or polyethylene glycol. Two or more of these diol compounds can be used in combination.

The acid-group-containing diol (g) is a diol compound containing one or more acidic group such as carboxylic and/or sulfonic groups. Specific examples include dimethylolalkanoic acid esters such as dimethylol acetate, dimethylol propionate and dimethylol butyrate. Two or more of these diol compounds can be used in combination. Among these, particularly preferred is dimethylol propionate.

A urethane prepolymer synthesized from one or more of these compounds is required to have an NCO/OH equivalent ratio of 1.1–1.9. NCO equivalent ratios smaller than 1.1 result in urethane polymers whose viscosities are too high to permit smooth dispersion in water. NCO equivalent ratios greater than 1.9, on the other hand, are prone to gelation upon extension with water or a polyamine.

Upon synthesis of the urethane prepolymer, a polyhydroxy compound of a low molecular weight can be added. Examples of such a low-molecular polyhydroxy compound include glycols mentioned above as raw materials for polyester diols, and low-mole alkylene oxide adducts thereof; and trihydric alcohols such as glycerin, trimethylolethane and trimethylolpropane, and low-mole alkylene oxide adducts thereof. The lower molecular polyhydroxy compound is used suitably in an amount of 20 wt. % or less based on the diol compound (f). Use of the low molecular polyhydroxy compound in amounts greater than 20 wt. % tend to result in friable coating films.

The urethane prepolymer obtained as described above is dispersed in water by extending it with water or a di- or tri-amine either after or while neutralizing its acidic groups, which have originated from the acid-group-containing diol, with a tertiary amine.

The amine employed for the neutralization is required to be tertiary. A primary or secondary amine is not suited because it reacts with the remaining isocyanate. Specific examples of the tertiary amine include trialkylamines such as trimethylamine and triethylamine; N-alkylmorpholines such as N-methylmorpholine; and N-alkylalkanolamines such as N-dimethylethanolamine. Two or more of these tertiary amines can be used in combination. In general, they can be used in an amount of 0.5–1 equivalent per equivalent of acidic groups in the urethane prepolymer.

As the polyamine employed for the amine extension, a diamine or triamine is usually used. Specific examples include hexamethylenediamine, isophoronediamine, hydrazine and piperazine. Two or more of these amines can be used in combination.

The water-base coating composition (C) can be prepared by mixing (III) the aqueous solution of the particulate vinyl polymer with (IV) the aqueous dispersion of the urethane polymer at a (III)/(IV) ratio of from 5/95 to 95/5 in terms of polymer solid. Blending percentages of the particulate vinyl polymer not greater than 5% cannot fully exhibit the advantages of the aqueous solution of the particulate vinyl polymer, that is, good pigment dispersibility and little insoluble aggregates. On the other hand, blending percentages of the particulate vinyl polymer greater than 95% cannot fully bring about the advantages of the aqueous dispersion of the urethane polymer, that is, good film-forming ability and good adhesion to plastic films. No particular limitation is imposed on the manner of mixing between (III) the aqueous solution of the particulate vinyl polymer and (IV) the aqueous dispersion of the urethane polymer. The aqueous solution (III) of the particulate vinyl polymer is used generally at a concentration of 20–35 wt. %. Further, the aqueous dispersion (IV) of the urethane polymer is employed generally at a concentration of 25–45 wt. %.

When the particulate vinyl polymer according to this invention is used as the water-base coating compositions (A) to (C), it is possible to incorporate additives such as defoaming agents, pigment dispersants and antiseptics.

Illustrative methods for coating the water-base coating compositions (A) to (C), which make use of the particulate vinyl polymer of this invention, include, but are not specifically limited to, spray coating, roller coating, blade coating, air-knife coating, flow casting, brushing, and dipping.

The present invention will hereinafter be described specifically by the following examples, in which all designations of "part" or "parts" and "%" are by weight. Incidentally, minor and major axes of particles will be indicated by "A" and "B" respectively.

The following methods and standards were employed for the testing and evaluation of particulate vinyl polymers.

Solubility Test of Particulate Vinyl Polymers in Aqueous Medium

In a 300-ml flask equipped with a stirrer, a thermometer and a reflux condenser and permitting both heating and cooling, 50 g of a particular vinyl polymer were charged along with deionized water in an amount determined by the below-described formula. Stirring was then initiated at 200 rpm by a single-blade agitator. After a 28% aqueous ammonia in an amount determined by the below-described calculation formula was then added over 5 minutes, the contents were heated to 50° C. and the stirring was continued. From the time required for the dissolution of the particulate vinyl polymer, the solubility of the particulate vinyl polymer in the aqueous medium was evaluated.

Amount (g) of aqueous ammonia to be added =

$$(A \times 50 \times 17)/(1,000 \times 56.1 \times 0.28)$$

[A: the acid value of the polymer (mgKOH/g)]
Amount (g) of deionized water to be added =

$$150 - (\text{the amount of aqueous ammonia to be added} \times 0.72)$$

(Solubility)

Excellent: Dissolution was completed in less than 60 minutes after heated to 50° C.

Good: Dissolution was completed in less than 90 minutes after heated to 50° C. (practically usable down to this solubility level).

Poor: Ninety minutes or longer were needed until full dissolution after heated to 50° C.

Insoluble: Dissolution was uncompleted even after 180 minutes had elapsed after heated to 50° C.

Evaluation Of Pigment Dispersibility and Waterproofness of Water-Base Coating Compositions (Pigment Dispersibility)

Twenty parts of carbon black ("#100", trade name; product of Degussa Inc.) were added to 100 parts of an aqueous solution of a particulate vinyl polymer, said aqueous solution having had the same composition as the sample employed in the above solubility test, and the resulting mixture was mixed for 2 hours in a planetary ball mill (manufactured by FRITCH INC.) to disperse the pigment. The water-base coating composition with the pigment dispersed therein was left over at room temperature for 100 days and the settling behavior of the pigment was visually observed.

Excellent: No settling of the pigment was observed even after 100 days had elapsed after left over.

Good: Settling of the pigment was observed on the 20th days after left over.

Poor: Settling of the pigment was observed on the 2nd day after left over.

(Waterproofness)

Twenty parts of carbon black ("#100", trade name; product of Degussa Inc.) were added to 100 parts of an aqueous solution of a particulate vinyl polymer, said aqueous solution having had the same composition as the sample employed in the above solubility test, and the resulting mixture was mixed for 2 hours in a planetary ball mill (manufactured by FRITCH INC.) to disperse the pigment. The water-base coating composition with the pigment dispersed therein was coated on a glass plate to give a solid film thickness of 80 μm. After drying the coating composition for 20 minutes in a drying furnace controlled at 50° C., the resultant coating film was immersed in water of 20° C. for 10 days, during which damages to the coating film were visually observed.

Excellent: No damage to the coating film was observed even after 10 days had elapsed after its immersion.

Good: Damages to the coating film, such as whitening and blisters, were observed on the 10th day after its immersion.

Poor: Damages to the coating film, such as whitening and blisters, were observed in 5 hours after its immersion.

EXAMPLE 1

Production of Particulate Vinyl Polymer (P-1)

In a polymerizer equipped with a stirrer, a thermometer and a reflux condenser and permitting both heating and cooling, 200 parts of deionized water were added to 0.6 part of polyvinyl alcohol (saponification degree: 80%, polymerization degree: 1,700), followed by stirring to completely dissolve the polyvinyl alcohol. The stirring was then interrupted once to add 70 parts of methyl methacrylate (hereinafter abbreviated as "MMA"), 10 parts of styrene (hereinafter abbreviated as "St"), 10 parts of n-butyl acrylate (hereinafter abbreviated as "n-BA") and 10 parts of methacrylic acid (hereinafter abbreviated as "MAA"). Stirring was resumed, and 0.5 part of azobisisobutylonitrile (hereinafter abbreviated as "AIBN") and 4 parts of n-dodecylmercaptan (hereinafter abbreviated as "n-DM") were then added. The contents were heated to 75° C. and were reacted for 3 hours while maintaining the reaction temperature at 75°–80° C. The reaction mixture was then heated to 95° C., at which the reaction mixture was held for 1 hour to complete the reaction. The reaction mixture was thereafter filtered through a mesh having an opening of 30 μm, whereby a particulate vinyl polymer was obtained. The polymer so obtained had an acid value of 65 mgKOH/g, a weight average molecular weight of 12,000 and a second-order transition temperature of 87° C. With respect to 1,000 particles of the resultant particulate vinyl polymer, their shapes were checked using a microscope. The percentage of particles, which had a minor axis A and a major axis B in the range of 30–400 μm and satisfied the relationship of B/A $\leq 1.5$, was at least 99%. Further, the percentage of particles, which had a minor axis A and a major axis B in the range of 30–400 μm and satisfied the relationship of B/A $\leq 1.1$, was 97%.

EXAMPLES 2–5 AND COMPARATIVE EXAMPLES 1–4

Production of Particulate Vinyl Polymers (P-2 to P-9)

In each Example, a vinyl monomer composition was polymerized using a radical polymerization initiator and a chain transfer agent in a similar manner to Example 1. The compositions and characteristic values of the resultant particulate vinyl polymers (Examples 2–5: P-2 to P-5; Comparative Examples 1–4: P-6 to P-9) are presented in Table 1.

TABLE 1

| Particulate vinyl polymer | Vinyl monomer | | | | | | | Polymerization initiator | | Chain transfer agent | |
|---|---|---|---|---|---|---|---|---|---|---|---|
| | MMA | St | n-BA | nBMA | EHA | MAA | AA | AIBN | BPO | n-DM | MeSt |
| P-2 | 65 | 10 | 18 | 0 | 0 | 7 | 0 | 0.4 | 0 | 7 | 0 |
| P-3 | 51 | 0 | 0 | 0 | 29 | 20 | 0 | 0.5 | 0 | 4 | 0 |
| P-4 | 50 | 24 | 6 | 10 | 0 | 10 | 0 | 0 | 2 | 0 | 2.1 |
| P-5 | 49 | 5 | 0 | 37 | 0 | 6 | 3 | 0.8 | 0 | 3 | 0 |
| P-6 | 80 | 0 | 15.6 | 0 | 0 | 4.4 | 0 | 0.5 | 0 | 6 | 0 |
| P-7 | 42 | 3 | 0 | 0 | 30 | 25 | 0 | 0.4 | 0 | 5 | 0 |
| P-8 | 73 | 0 | 0 | 15 | 0 | 12 | 0 | 0.3 | 0 | 0.1 | 0 |
| P-9 | 40 | 35 | 0 | 0 | 12 | 13 | 0 | 0 | 3 | 0 | 3 |

| Particulate vinyl polymer | Acid value [mgKOH/g] | Weight-average molecular weight | Second-order transition temperature [°C] | Particles of specified shape I [%] | Particles of specified shape II [%] |
|---|---|---|---|---|---|
| P-2 | 45.5 | 8500 | 68 | at least 99% | 97% |
| P-3 | 130.0 | 11000 | 50 | at least 99% | 98% |
| P-4 | 65.2 | 21000 | 87 | at least 99% | 98% |
| P-5 | 63.0 | 16000 | 72 | at least 99% | 97% |
| P-6 | 28.7 | 8500 | 72 | at least 99% | 96% |
| P-7 | 163.0 | 10000 | 50 | at least 99% | 97% |
| P-8 | 78.3 | 120000 | 98 | at least 99% | 98% |
| P-9 | 84.5 | 17000 | 80 | at least 99% | 97% |

Particles of specified shape I

The percentage of particles having a minor axis A and a major axis B in the range of 30–400 μm and satisfying the relationship of $1 \leq B/A \leq 1.5$.

Particles of specified shape II

The percentage of particles having a minor axis A and a major axis B in the range of 30–400 μm and satisfying the relationship of $1 \leq B/A \leq 1.1$.

Abbreviations nBMA: n-butyl methacrylate
EHA: ethylhexyl acrylate
AA: acrylic acid
BPO: benzoyl peroxide
MeSt: e-methylstyrene dimer

COMPARATIVE EXAMPLE 5

Production of Particulate Vinyl Polymer (P-10)

Following the procedures of Example 1, the same vinyl monomer composition as that employed in Example 1 was polymerized and the polymerization suspension was dried by warm wind of 40° C., so that a particulate vinyl polymer (P-10) was obtained. The polymer so obtained had an acid value of 65 mgKOH/g, a weight average molecular weight of 12,000 and a second-order transition temperature of 87° C. With respect to 1,000 particles of the resultant particulate vinyl polymer, their shapes were checked using a microscope. The percentage of particles, which had a minor axis A and a major axis B in the range of 30–400 μm and satisfied the relationship of $B/A \leq 1.5$, was 93.5%.

EXAMPLE 6

Production of Particulate Vinyl Polymer (P-11)

In a polymerizer equipped with a stirrer, a thermometer and a reflux condenser and permitting both heating and cooling, 100 parts of isopropanol, 65 parts of MMA, 10 parts of St, 12 parts of n-BA, 13 parts of MAA, 2 parts of AIBN and 3 parts of n-DM were charged and stirred. The contents were heated to 80° C., followed by the initiation of a reaction. While adding 0.2 part of AIBN at every hour, the reaction mixture was maintained at the same temperature for 9 hours. The reaction was then terminated, whereby a solution of a vinyl polymer in isopropanol, whose solid content and viscosity were 51% and 10,000 cps, was obtained. The solution was depressurized while heating it at 70° C., so that isopropanol was distilled off and the polymer was obtained in a solid form. The polymer in the solid form was heated to 200° C. and while being maintained in the molten form, the polymer was poured into water of 20° C. under vigorous agitation to form the polymer into particles. The particles were then filtered through a mesh having an opening of 30 μm, whereby a particulate vinyl polymer was obtained. The polymer so obtained had an acid value of 85.5 mgKOH/g, a weight average molecular weight of 13,000 and a second-order transition temperature of 84° C. With respect to 1,000 particles of the resultant particulate vinyl polymer, their shapes were checked using a microscope. The percentage of particles, which had a minor axis A and a major axis B in the range of 30–400 μm and satisfied the relationship of $B/A \leq 1.5$, was 96.0%.

COMPARATIVE EXAMPLE 6

Production of Particulate Vinyl Polymer (P-12)

In a polymerizer equipped with a stirrer, a thermometer and a reflux condenser and permitting both heating and cooling, 100 parts of isopropanol, 65 parts of MMA, 10 parts of St, 12 parts of n-BA, 13 parts of MAA, 2 parts of AIBN and 3 parts of n-DM were charged and stirred. The contents were heated to 80° C., followed by the initiation of a reaction. While adding 0.2 part of AIBN at every hour, the reaction mixture was maintained at the same temperature for 9 hours. The reaction was then terminated, whereby a solution of a vinyl polymer in isopropanol, whose solid content and viscosity were 51% and 10,000 cps, was obtained. The solution was depressurized while heating it at 70° C., so that isopropanol was distilled off and the polymer was obtained in a solid form. The solid polymer was formed into slender rods of 3 mm in diameter by a twin-screw kneader. Those slender rods were chopped by a pelletizer under conditions satisfying the relationship of $B/A \leq 1.5$, whereby a particulate vinyl polymer was obtained. The polymer so obtained had an acid value of 85.5 mgKOH/g, a weight average molecular weight of 13,000 and a second-order transition temperature of 84° C. With respect to 1,000 particles of the resultant particulate vinyl polymer, their shapes were checked. The percentage of particles, which had a major axis B of 400 μm or longer, was at least 99%.

COMPARATIVE EXAMPLE 7

Production of Particulate Vinyl Polymer (P-13)

In a polymerizer equipped with a stirrer, a thermometer and a reflux condenser and permitting both heating and cooling, 100 parts of isopropanol, 65 parts of MMA, 10 parts of St, 12 parts of n-BA, 13 parts of MAA, 2 parts of AIBN and 3 parts of n-DM were charged and stirred. The contents were heated to 80° C., followed by the initiation of a reaction. While adding 0.2 part of AIBN at every hour, the reaction mixture was maintained at the same temperature for 9 hours. The reaction was then terminated, whereby a solution of a vinyl polymer in isopropanol, whose solid content and viscosity were 51% and 10,000 cps, was obtained. The solution was poured into a vat and while being heated at 70° C., depressurized, so that isopropanol was distilled off and the polymer was obtained in a bulk form. The bulk polymer was then ground by a grinder so that particles having a major axis B not greater than 400 μm (B≦400 μm) accounted for at least 98%, whereby a particulate vinyl polymer was obtained. The polymer so obtained had an acid value of 85.5 mgKOH/g, a weight average molecular weight of 13,000 and a second-order transition temperature of 84° C. With respect to 1,000 particles of the resultant particulate vinyl polymer, their shapes were checked using a microscope. Seventy percent of the particulate vinyl polymer satisfied the relationship of B/A≦1.5. Further, particles having a minor axis A and a major axis B not greater than 30 μm accounted to 30%.

EVACUATION TESTS

The workability of each of the particulate vinyl polymers (P-1) to (P-13), its solubility in an aqueous medium and its properties as a water-base coating composition were evaluated in accordance with the evaluation standards described above. The results are presented in Table 2.

TABLE 2

| | Particulate vinyl polymer | Workability | | Solubility in aqueous medium | Evaluation of aqueous coating composition | |
|---|---|---|---|---|---|---|
| | | Free flowing property | Dust-free property | | Pigment dispersion | Water Proofness |
| Example No. | | | | | | |
| Example 1 | P-1 | Good | Good | Excellent | Excellent | Excellent |
| Example 2 | P-2 | Good | Good | Excellent | Excellent | Excellent |
| Example 3 | P-3 | Good | Good | Excellent | Excellent | Good |
| Example 4 | P-4 | Good | Good | Good | Excellent | Excellent |
| Example 5 | P-5 | Good | Good | Excellent | Excellent | Good |
| Example 6 | P-11 | Good | Slightly good | Excellent | Excellent | Good |
| Comparative Example No. | | | | | | |
| Comp. Ex. 1 | P-6 | Good | Good | Insoluble | No data available due to lack of solubility in aqueous medium | |
| Comp. Ex. 2 | P-7 | Good | Good | Excellent | Excellent | Poor |
| Comp. Ex. 3 | P-8 | Good | Good | Insoluble | No data available due to lack of solubility in aqueous medium | |
| Comp. Ex. 4 | P-9 | Good | Good | Insoluble | No data available due to lack of solubility in aqueous medium | |
| Comp. Ex. 5 | P-10 | Poor | Good | Excellent | Excellent | Excellent |
| Comp. Ex. 6 | P-12 | Good | Good | Poor | Good | Good |
| Comp. Ex. 7 | P-13 | Poor | Poor | Excellent | Good | Good |

EXAMPLES 8–10

Production of Particulate Vinyl Polymers (P-14 to P-16)

In each Example, a vinyl monomer composition was polymerized using a radical polymerization initiator and a chain transfer agent in a similar manner to Example 1. The compositions and characteristic values of the resultant particulate vinyl polymers (P-14 to P-16) are presented in Table 3.

TABLE 3

| Particulate vinyl polymer | Vinyl monomer | | | | | | | Polymerization initiator | | Chain transfer agent | |
|---|---|---|---|---|---|---|---|---|---|---|---|
| | MMA | St | n-BA | nBMA | EHA | MAA | AA | AIBN | BPO | n-DM | MeSt |
| P-14 | 52 | 0 | 0 | 0 | 34 | 14 | 0 | 0.4 | 0 | 4 | 0 |
| P-15 | 60 | 17 | 0 | 10 | 0 | 10 | 3 | 0 | 2 | 0 | 2.1 |

TABLE 3-continued

| P-16 | 40 | 0 | 0 | 37 | 0 | 18 | 0 | 0.8 | 0 | 3 | 0 |

| Particulate vinyl polymer | Acid value [mgKOH/g] | Weight-average molecular weight | Second-order transition temperature [°C.] | Particles of specified shape I [%] | Particles of specified shape II [%] |
|---|---|---|---|---|---|
| P-14 | 91.0 | 11000 | 37 | at least 99% | 98% |
| P-15 | 88.6 | 21000 | 100 | at least 99% | 97% |
| P-16 | 117.4 | 16000 | 79 | at least 99% | 98% |

SYNTHESIS EXAMPLE 1

Preparation of Aqueous Polymer Dispersion (II-1)

In a polymerizer equipped with a stirrer, a thermometer and a reflux condenser and permitting both heating and cooling, were charged 100 parts of deionized water, 2 parts of polyoxyethylene nonylphenyl ether containing 35 oxyethylene units, 1 part of sodium lauryl sulfate and 0.5 part of potassium persulfate. Stirring was then initiated and the contents were heated to 70° C., followed by the dropwise addition of a mixture of 57 parts of MMA, 25 parts of n-butyl methacrylate, 15 parts of n-BA and 3 parts of MAA over 4 hours. The resulting mixture was then heated to 80° C., at which the reaction mixture was held for 2 hours to complete the reaction so that an aqueous polymer dispersion was obtained. The polymer so formed had a second-order transition temperature of 52° C. and a weight average molecular weight of 1,000,000. The aqueous dispersion had a solid content of 50% and a viscosity of 3,000 cps.

SYNTHESIS EXAMPLE 2

Preparation of Aqueous Polymer Dispersion (II-2)

By a preparation process similar to that of Synthesis Example 1, was polymerized a mixture of vinyl monomers consisting of 85 parts of St, 14 parts of ethylhexyl acrylate and 1 part of MAA. A polymer whose second-order transition temperature and weight average molecular weight were 67° C. and 500,000 was obtained. An aqueous dispersion so obtained had a solid content of 50% and a viscosity of 800 cps.

SYNTHESIS EXAMPLE 3

Preparation of Aqueous Polymer Dispersion (II-3)

In a polymerizer equipped with a stirrer, a thermometer and a reflux condenser and permitting both heating and cooling, were charged 25 parts of isopropanol, 42 parts of MMA, 23 parts of St, 28 parts of n-BMA, 7 parts of MAA and 0.1 part of AIBN. The contents were then heated to 80° C., at which the contents were held for 7 hours while charging 0.1 part of AIBN every hour. The reaction mixture was then cooled to 50° C., followed by the gradual charging of 3.1 parts of 28% aqueous ammonia and 150 parts of deionized water. The resulting mixture was then heated to 95° C. over 3 hours, whereby isopropanol was distilled off to about 1% of its initial charge to obtain an aqueous polymer dispersion. A polymer whose second-order transition temperature and weight average molecular weight were 76° C. and 350,000 was obtained. An aqueous dispersion so obtained had a solid content of 40% and a viscosity of 200 cps.

SYNTHESIS EXAMPLE 4

Preparation of Aqueous Polymer Dispersion (II-4)

In a 1,000-ml reaction vessel equipped with a stirrer, a thermometer and a condenser, were charged 13 parts of dimethylolpropionic acid, 80 parts of N-methyl-2-pyrrolidone, 100 parts of polytetramethylene glycol and 5 parts of trimethylol propane. The contents were heated to 90° C. so that they were converted into a solution. Next, 48 parts of isophorone diisocyanate were added and after stirring it for 10 minutes, 0.1 part of dibutyl tin dilaurate was added. The resulting mixture was then heated to 95° C., at which a reaction was conducted for 1 hour.

After the hydrophilic-group-containing oligomer so obtained was neutralized with 5 parts of triethylamine, 300 parts of deionized water were added, followed by stirring for 1 hour to obtain an aqueous dispersion. A polymer whose second-order transition temperature and weight average molecular weight were 40° C. and 220,000 was obtained. An aqueous dispersion so obtained had a solid content of 29% and a viscosity of 8,000 cps.

EXAMPLE 11

Weighed in a beaker were 60 g of a 25%-solid aqueous solution (I-1) of the particulate vinyl polymer (P-1; neutralization degree of the acidic groups: 100%), which had been produced according to the process described above under the Solubility Test, and 120 g of the aqueous polymer dispersion (II-1). They were gently mixed with a stick so that a liquid blend formulation [a water-base coating composition (B)] was prepared. In this case, the ratio of the aqueous solution (I-1) of the particulate vinyl polymer to the aqueous polymer dispersion (II-1) was 20:80 in terms of polymer solid. No precipitate was observed upon an elapsed time of 24 hours after the blending, whereby good compatibility of the particulate vinyl polymer (P-1) as a solution was confirmed. The liquid blend formulation was coated on a glass plate to give a solid film thickness of 80 μm. When dried in an environment controlled at 15° C. and 60% RH, the liquid blend formulation so coated became tack-free in 2 minutes so that a transparent coating film free of cracks was formed. Even when the coating film was rubbed with a nail, no damages such as scratches were observed on the coating film. Further, two glass plates coated in the above-described manner were provided. Those glass plates were superposed one over the other with their coated sides maintained in a contiguous relationship and were then left over for 2 days in an environment controlled at 30° C. and 70% RH. No cohesion between the coating films was observed. After a further glass plate also coated in the above-described manner was immersed for 20 hours in deionized water of 30° C., the coated glass plate was pulled out of the deionized water and then left over for 1 hour in a room controlled at 15° C. and 60% RH. No changes were observed on its coating film.

EXAMPLES 12–18 AND COMPARATIVE EXAMPLES 8–10

In each Example, a liquid blend formulation was prepared and evaluated as in Example 11. The results are presented in Table 4. Symbols assigned to represent the results of the respective evaluation tests have the following meanings:

[Compatibility]

Solution

S: No precipitate was observed.

IS: Precipitate was observed.

Coating film

C: The coating film was transparent, indicating good compatibility.

VSH: The coating film was slightly opaque, indicating somewhat poor compatibility.

SH: The coating film was more opaque than the VSH rank, indicating lower quality in compatibility than the VSH rank.

H: The coating film was more opaque than the SH rank, indicating lower quality in compatibility than the SH rank (quality level of no practical utility).

[Film-Forming Ability]

A glass plate was coated to give a solid thickness of 80 μm, followed by drying in an environment controlled at 15° C. and 60% RH.

Good: A good coating film free of cracks was formed.

Poor: Cracks were formed in the coating film.

[Abrasion Resistance (Toughness of Coating Film)]

A glass plate was coated to give a solid thickness of 80 μm, followed by drying in an environment controlled at 15° C. and 60% RH. The coating film so formed was then rubbed with a nail.

Good: No damages such as scratches were observed on the coating film.

Poor: The coating film was damaged, for example, scratched or crazed.

[Blocking Resistance]

Two glass plates were each coated to give a solid film thickness of 80 μm, followed by drying in an environment controlled at 15° C. and 60% RH. The glass plates were superposed one over the other with their coated sides maintained in a contiguous relationship and were then left over for 2 days in an environment controlled at 30° C. and 70% RH.

Good: No cohesion was observed between the coating films.

Poor: The coating films cohered.

[Waterproofness]

A glass plate was coated to give a solid film thickness of 80 μm, followed by drying in an environment controlled at 15° C. and 60% RH. The glass plate was immersed for 2 days in warm water of 40° C. and was then pulled out of the warm water. The glass plate was thereafter left over for 1 hour in a room controlled at 15° C. and 60% RH.

Good: No changes were observed on the coating film.

Poor: The coating film was subjected to a certain damage such as whitening.

TABLE 4

| | | Example/Comparative Example No. | | | | | | | | |
|---|---|---|---|---|---|---|---|---|---|---|
| | | Example 12 | Example 13 | Example 14 | Example 15 | Example 16 | Example 17 | Example 18 | Comp. Ex. 8 | Comp. Ex. 9 | Comp. Ex. 10 |
| Aqueous soln. of particulate vinyl polymer (polymer) | | I-1 (P-1) | I-2 (P-2) | I-14 (P-14) | I-15 (P-15) | I-1 (P-1) | I-16 (P-16) | I-11 (P-11) | I-14 (P-14) | I-6 (P-6) | I-7 (P-7) |
| Workability of particulate vinyl polymer | Free flowing property | Good | Good | Good | Good | Good | Good | Good | Good | Good | Good |
| | Dust-free property | Good | Good | Good | Good | Good | Good | Slightly good | Good | Good | Good |
| Solubility of particulate vinyl polymer in aq. medium | | Excellent | Excellent | Excellent | Good | Excellent | Excellent | Excellent | Excellent | Insoluble | Excellent |
| Aqueous dispersion of polymer | | II-2 | II-4 | II-3 | II-1 | II-4 | II-2 | II-3 | II-2 | No data available due to lack of solubility in aqueous medium | II-4 |
| I/II (solid ratio of polymer) | | 50/50 | 20/80 | 40/60 | 50/50 | 20/80 | 8/92 | 35/65 | 3/97 | | 10/90 |
| Compatibility | Solution | S | S | S | S | S | S | S | S | No data available due to lack of solubility in aqeuous medium | IS |
| | Coated film | C | C | C | C | C | VSH | VSH | C | | H |
| Film-forming property | | Good | Good | Good | Good | Good | Good | Good | Poor | | Good |
| Abrasion resistance | | Good | Good | Good | Good | Good | Good | Good | Poor | | Good |
| Blocking resistance | | Good | Good | Good | Good | Good | Good | Good | Good | | Good |
| Wateproofness | | Good | Good | Good | Good | Good | Good | Good | Good | | Poor |

EXAMPLES 19–21 AND COMPARATIVE EXAMPLE 11

Production of Particulate Vinyl Polymers (P-17 to P-20)

In each Example, a vinyl monomer composition was polymerized using a radical polymerization initiator and a chain transfer agent in a similar manner to Example 1. The compositions and characteristic values of the resultant particulate vinyl polymers (Examples 19–21: P-17 to P-19, Comparative Example 11 : P-20) are presented in Table 5.

TABLE 5

| Particulate vinyl polymer | Vinyl monomer | | | | | | | Polymerization initiator | | Chain transfer agent | |
|---|---|---|---|---|---|---|---|---|---|---|---|
| | MMA | St | n-BA | nBMA | EHA | MAA | AA | AIBN | BPO | n-DM | MeSt |
| P-17 | 45 | 10 | 38 | 0 | 0 | 7 | 0 | 0.4 | 0 | 5 | 0 |
| P-18 | 68 | 0 | 0 | 15 | 0 | 14 | 0 | 0.4 | 0 | 4 | 0 |
| P-19 | 60 | 20 | 0 | 0 | 7 | 10 | 3 | 0 | 2 | 0 | 2.5 |
| P-20 | 40 | 3 | 0 | 0 | 25 | 32 | 0 | 0.4 | 0 | 5 | 0 |

| Particulate vinyl polymer | Acid value [mgKOH/g] | Weight-average molecular weight | Second-order transition temperature [°C.] | Particles of specified shape I [%] | Particles of specified shape II [%] |
|---|---|---|---|---|---|
| P-17 | 45.5 | 9000 | 32 | at least 99% | 96% |
| P-18 | 91.0 | 11000 | 110 | at least 99% | 97% |
| P-19 | 88.2 | 17000 | 92 | at least 99% | 97% |
| P-20 | 208.5 | 10000 | 65 | at least 99% | 98% |

SYNTHESIS EXAMPLE 5

Preparation of Aqueous Urethane Polymer Dispersion (IV-1)

In a 1,000-ml reaction vessel equipped with a thermometer, a stirrer and a condenser, were charged 13 parts of dimethylolpropionic acid, 80 parts of N-methyl-2-pyrrolidone and 100 parts of polytetramethylene glycol (number average molecular weight: 1,900). The contents were heated to 90° C. Next, 48 parts of isophorone diisocyanate were added and after stirring it for 10 minutes, 0.1 part of dibutyl tin dilaurate was added. The resulting mixture was then heated to 95° C., at which a reaction was conducted for 1 hour.

After the hydrophilic-group-containing urethane polymer so obtained was neutralized with 10 parts of triethylamine, 300 parts of deionized water were added, followed by stirring for 1 hour to extend the polymer with water. The resultant mixture was a stable aqueous dispersion, whose solid content and viscosity were 29.2% and 5,000 cps.

SYNTHESIS EXAMPLE 6

Preparation of Aqueous Urethane Polymer Dispersion (IV-2)

In the same reaction vessel as that employed in Synthesis Example 5, were charged 6 parts of dimethylolpropionic acid, 40 parts of N-methyl-2-pyrrolidone and 100 parts of polypropylene glycol (number average molecular weight: 1,850). The contents were heated to 90° C. Next, 48 parts of isophorone diisocyanate were added and after stirring it for 10 minutes, 35 parts of hexamethylene diisocyanate were added. The resulting mixture was stirred for 10 minutes, followed by the addition of 0.1 part of dibutyl tin dilaurate. The mixture so obtained was heated to 95° C. and was then reacted for 1 hour.

After the hydrophilic-group-containing urethane polymer so obtained was neutralized with 5 parts of triethylamine, 300 part of deionized water were added, followed by stirring for 1 hour to extend the polymer with water. The resultant mixture was a stable aqueous dispersion, whose solid content and viscosity were 30.2% and 1,000 cps.

SYNTHESIS EXAMPLE 7

Preparation of Aqueous Urethane Polymer Dispersion (IV-3)

In the same reaction vessel as that employed in Synthesis Example 5, were charged 6 parts of dimethylolpropionic acid, 40 parts of N-methyl-2-pyrrolidone and 42 parts of polyethylene glycol (number average molecular weight: 2,200). The contents were heated to 90° C. Next, 48 parts of isophorone diisocyanate were added and after stirring it for 10 minutes, 35 parts of hexamethylene diisocyanate were added. The resulting mixture was stirred for 10 minutes, followed by the addition of 0.1 part of dibutyl tin dilaurate. The mixture so obtained was heated to 95° C. and was then reacted for 1 hour.

After the hydrophilic-group-containing urethane polymer so obtained was neutralized with 10 parts of triethylamine, 300 parts of deionized water were added, followed by dispersion in water. The dispersion so obtained was added with 8 parts of isophoronediamine, followed by stirring for 1 hour so that the urethane polymer was extended with the diamine. The resultant mixture was a stable aqueous dispersion, whose solid content and viscosity were 30.2% and 1,000 cps.

EXAMPLE 22

Weighed in a beaker were 60 g of a 25%-solid aqueous solution (III-1) of the particulate vinyl polymer (P-1; neutralization degree of the acidic groups: 100%), which had been produced according to the process described above under the Solubility Test, and 120 g of the aqueous urethane polymer dispersion (IV-1). They were gently mixed with a stick so that a liquid blend formulation [a water-base coating composition (C)] was prepared. In this case, the ratio of the aqueous solution (III-1) of the particulate vinyl polymer to the aqueous urethane polymer dispersion (IV-1) was 30:70 in terms of polymer solid. No precipitate was observed upon an elapsed time of 24 hours after the blending, whereby good compatibility of the particulate vinyl polymer (P-1) as a solution was confirmed. The liquid blend formulation was coated on a glass plate to give a solid film thickness of 80 μm. When dried, the liquid blend formulation so coated turned to a transparent coating film so that the particulate vinyl polymer was confirmed to have good compatibility with the urethane polymer in the coating film. Twenty parts of "Carbon Black #100" (trade name; product of Degussa Inc.) were added to 100 parts of the polymers in the liquid blend formulation. The resulting mixture was mixed for 2 hours in a planetary ball mill (manufactured by FRITSCH INC.) so that the pigment was dispersed. The resultant pigment dispersion was then left over for 3 days at room temperature. No settling of the pigment was observed. Further, the liquid blend formulation was coated on a polyester film ("Lumirror E-35", trade name; product of Toray Industries, Inc) to give dry film thickness of 20 μm, followed by drying. A adhesive cellophane tape (product of Nichiban Co., Ltd.) was pressed against the coating film and was then peeled off. The coating film was not stuck off onto an adhesive layer of the cellophane tape.

EXAMPLES 23–28 AND COMPARATIVE EXAMPLES 12–14

In each Example, a liquid blend formulation was prepared and evaluated as in Example 22. The results are presented in Table 6. Symbols assigned to represent the results of the respective evaluation tests have the following meanings:
[Compatibility]
The symbols have the same meanings as described above with respect to Table 4.
[Pigment dispersibility]
Good: No settling of the pigment was observed three days later.
Poor: Setting of the pigment was observed three days later.
[Adhesion]
Good: Not stuck off onto the adhesive layer of the cellophane tape.
Poor: Stuck off onto the adhesive layer of the cellophane tape.

The particulate vinyl polymer according to the present invention is excellent in workability such as the dissolution in an aqueous medium and also superb in pigment dispersibility and waterproofness, and is industrially very valuable as a raw material for water-base coating compositions.

The water-base coating composition (A) can form a coating film excellent in both waterproofness and pigment dispersion. The above advantageous effects of the particulate vinyl polymer according to this invention are marked in a water-base coating composition free of any organic solvent, because no conventional particulate vinyl polymer, when coated without any organic solvent, can achieve excellent waterproofness and superb pigment dispersion at the same time.

According to the water-base coating composition (B), a crack-free tough coating film can be formed without using any organic solvent. This coating film has a glass transition point Tg higher than room temperature, is excellent in antifouling property, blocking resistance and waterproofness, and also has good drying property. Further, the aqueous solution of the particulate vinyl polymer of this invention has broad compatibility with aqueous dispersions of various polymers so that mere blending of the aqueous solution and the aqueous dispersions permits their hybridization. A wide variety of water-base coating compositions can be easily developed as commercial products.

The water-base coating composition (C) has good pigment dispersibility, does not form much insoluble agglomerates upon coating, and can form a tough coating film having good adhesion to a plastic film. Further, the water-base coating composition (C) can be prepared by simply blending an aqueous dispersion of a urethane polymer with an aqueous solution of a vinyl polymer. A wide variety of commercial products can therefore be developed.

What is claimed is:

1. A water-based coating composition comprising an aqueous medium and a particulate vinyl polymer, wherein at least 95 wt. % of particles of said polymer have a minor axis

TABLE 6

| | | Example/Comparative Example No. | | | | | | | | |
|---|---|---|---|---|---|---|---|---|---|---|
| | | Example 23 | Example 24 | Example 25 | Example 26 | Example 27 | Example 28 | Comp. Ex. 12 | Comp. Ex. 13 | Comp. Ex. 14 |
| Aqueous soln. of Particulate vinyl polymer (polymer) | | III-1 (P-1) | III-1 (P-1) | III-17 (P-17) | III-18 (P-18) | III-19 (P-19) | III-11 (P-11) | III-6 (P-20) | III-6 (P-20) | III-1 (P-1) |
| Workability of particulate vinyl polymer | Free flowing property | Good | Good | Good | Good | Good | Good | Good | Good | Good |
| | Dust-free property | Good | Good | Good | Good | Good | Good | Good | Good | Good |
| Solubility of particulate vinyl polymer in aq. medium | | Excellent | Excellent | Excellent | Excellent | Excellent | Excellent | Insoluble | Excellent | Excellent |
| Aqueous dispersion of polymer | | IV-1 | IV-2 | IV-3 | IV-2 | IV-3 | IV-1 | No data available | IV-2 | IV-1 |
| III/IV (solid ratio of polymer) | | 70/30 | 25/75 | 85/15 | 50/50 | 20/80 | 25/75 | due to lack of solubility in aqueous medium | 30/70 | 3/97 |
| Compatibility | Solution | S | S | S | S | S | S | No data available due to lack of solubility in aqeuous medium | IS | S |
| | Coated film | C | C | C | C | C | VSH | | H | C |
| Film-forming property | | Good | Good | Good | Good | Good | Good | | Good | Poor |
| Pigment dispersibility | | Good | Good | Good | Good | Good | Good | | Poor | Poor |
| Adhesion | | Good | Good | Good | Good | Good | Good | | Good | Good |

A and a major axis B, said minor and major axes A and B being in a relationship of $1 \leq B/A \leq 1.5$ and individually ranging from 30 μm to 400 μm, and said polymer has an acid value of from 30 to 150 mgKOH/g.

2. A water-base coating composition comprising:

(I) an aqueous vinyl polymer solution formed of an aqueous medium and a particulate vinyl polymer according to claim 1, said particulate vinyl polymer having been neutralized with a base so that said particulate vinyl polymer is dissolved in said aqueous medium, and (II) an aqueous dispersion of a polymer having a weight average molecular weight of from 200,000 to 2,000,000;

wherein the ratio of said aqueous vinyl polymer (I) to said aqueous dispersion (II) ranges from 5/95 to 95/5 in terms of polymer solid.

3. A water-base coating composition according to claim 2, wherein said polymer in said aqueous dispersion (II) has a second-order transition temperature of from 30° to 120° C.

4. A water-base coating composition comprising:

(III) a vinyl polymer solution formed of water and a particulate vinyl polymer according to claims 1, said particulate vinyl polymer having been neutralized with a base so that said particulate vinyl polymer is dissolved in said water; and (IV) an aqueous dispersion formed of water and a urethane polymer which is obtained by extending a urethane prepolymer with water or amine after or while neutralizing the urethane prepolymer with a tertiary amine, and said urethane prepolymer comprising (e) an aliphatic or alicyclic diisocyanate, (f) a diol compound having a number average molecular weight of from 500 to 5,000 and (g) an acidic-group-containing diol and having an NCO/OH equivalent ratio of from 1.1 to 1.9.

5. A water-base coating composition according to claim 4, wherein the mixing ratio of said vinyl polymer solution (III) to said aqueous dispersion (IV) is from 5/95 to 95/5 in terms of solid.

6. A water-base coating composition according to claim 4, wherein said particulate vinyl polymer has a second-order transition temperature of from 20° to 110° C. and a weight average molecular weight of from 6,000 to 30,000.

7. A water-base coating composition according to claim 1, wherein said polymer comprises:

(a) 30 to 90 wt. % of methyl methacrylate, (b) 0 to 30 wt. % of an aromatic vinyl compound, (c) 4 to 30 wt. % of an acidic-group-containing vinyl compound and (d) 0 to 66 wt. % of a further vinyl monomer copolymerizable with said methyl methacrylate, said aromatic vinyl compound and said acidic-group-containing vinyl compound.

8. A water-base coating composition according to claim 7, wherein said acid-group-containing vinyl compound (c) comprises methacrylic acid.

9. A water-base coating composition according to claim 1, wherein said polymer has a second-order transition temperature of from 10° to 150° C. and a weight average molecular weight of from 6,000 to 100,000.

10. A water-base coating composition according to claim 1, wherein said polymer has been polymerized by suspension polymerization.

11. A water-base coating composition comprising an aqueous medium and a particulate vinyl polymer according to claim 1, wherein 50 to 100% of said particular vinyl polymer have been neutralized with a base having a boiling point not higher than 200° C. so that said particulate vinyl polymer is dissolved in said aqueous medium.

* * * * *